Feb. 25, 1936.   H. W. NIEMAN ET AL   2,032,066
CLUTCH
Filed Nov. 14, 1933   2 Sheets-Sheet 1
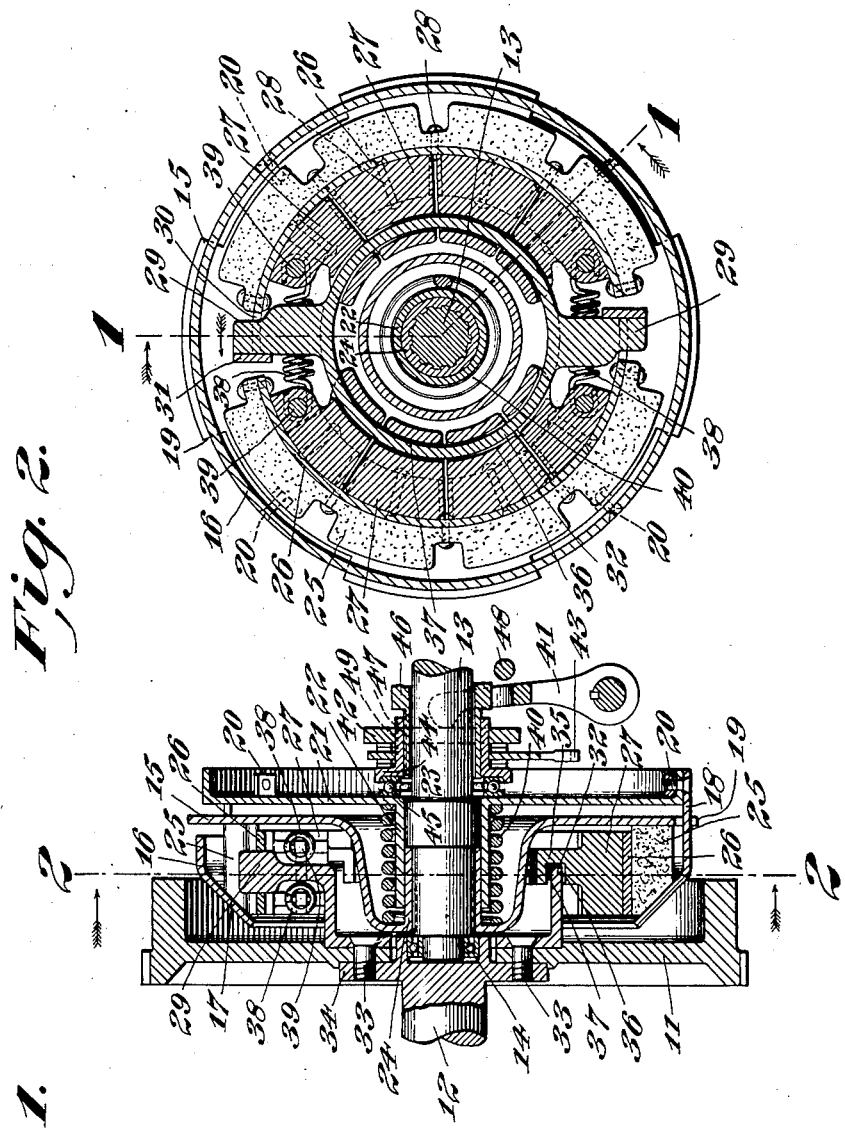
Inventors
Henry W. Nieman and
Garrett B. Linderman, Jr.
By R. S. C. Dougherty
Attorney Feb. 25, 1936.   H. W. NIEMAN ET AL   2,032,066
CLUTCH
Filed Nov. 14, 1933   2 Sheets-Sheet 2
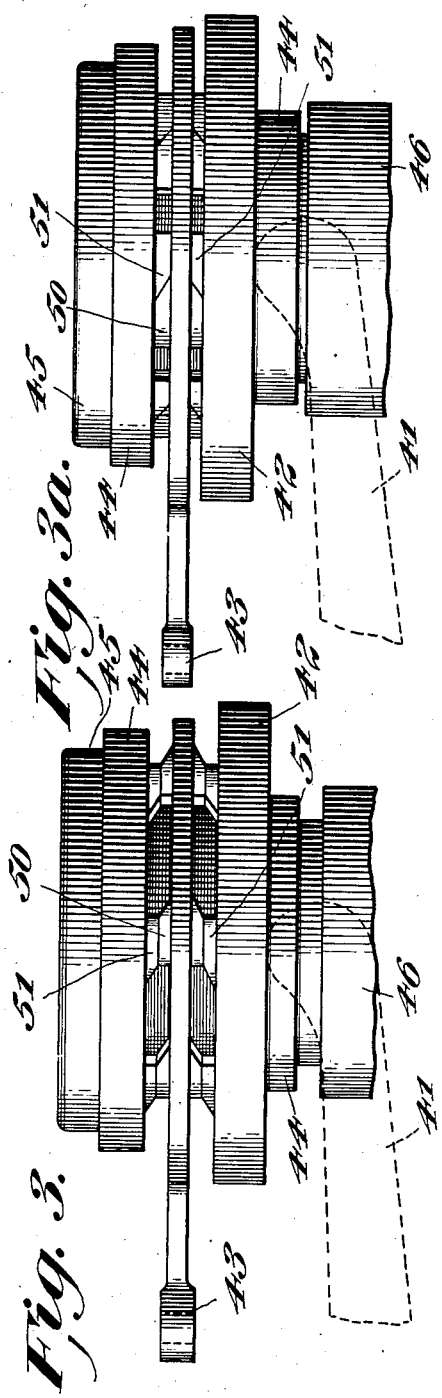
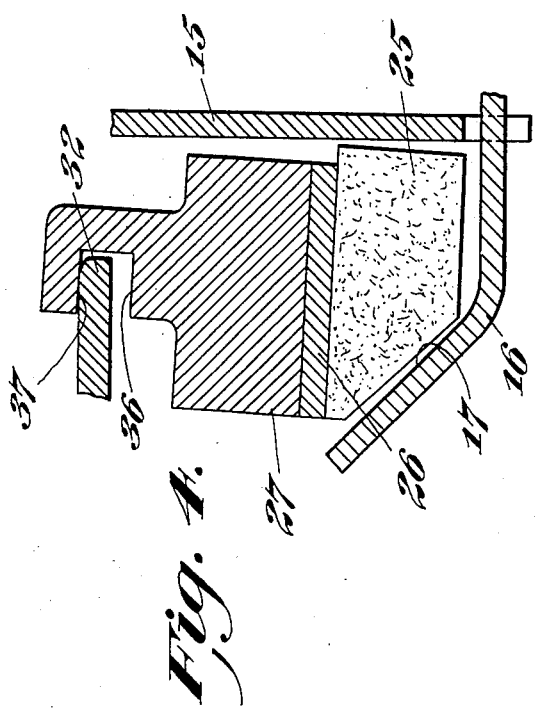
Inventors
Henry W. Nieman and
Garrett B. Linderman, Jr.
By R. S. Ce. Dougherty.
Attorney Patented Feb. 25, 1936

2,032,066

UNITED STATES PATENT OFFICE 2,032,066

CLUTCH

Henry W. Nieman, Bethlehem, and Garrett B. Linderman, Jr., Pittsburgh, Pa., assignors to Bethlehem Steel Company, a corporation of Pennsylvania Application November 14, 1933, Serial No. 697,893

8 Claims. (Cl. 192—105)

This invention relates to a friction clutch for power transmission, especially adapted to automotive vehicles, in which the clutching action is controlled in such a manner that under normal operation the clutch will automatically disengage when the speed of the engine drops below a predetermined minimum and will reengage when the speed rises above a minimum. While clutches having this characteristic are old in the art, the action being controlled by centrifugal force or a combination of centrifugal and spring forces, the present invention differs from those hitherto designed in employing a novel combination of elements to insure constancy and stability in operating characteristics. With the older clutches a change in the surface condition of the frictioning surfaces will change the engine speed required to produce a clutching force of given intensity, whereas in the present invention wide variations of the coefficient of friction of the surfaces can take place with merely nominal change in operating characteristics. Moreover a clutch built according to the principles of this invention can be made with a minimum number and complexity of parts, and will be exceptionally smooth in operation.

In the drawings which show one embodiment of the invention for purposes of illustration Fig. 1 is an elevation in section of the device along the line 1—1 of Fig. 2; Fig. 2 is an elevation in section along the line 2—2 of Fig. 1; Figs. 3 and 3a show two positions of the throw off mechanism embodied in the structure shown in Figs. 1 and 2; Fig. 4 is a portion of Fig. 1 with the parts in different relative positions.

In the drawings 11 represents a flywheel attached to shaft 12 of an automobile engine. Transmission shaft 13 is centered in relation to shaft 12 by pilot bearing 14 and has rigidly splined to it plate member 15. Annular member 16, having a conical face 17 and a cylindrical portion 18 is slotted to engage with projections 19 of plate 15 so that annular member 16 revolves with plate 15 as a unit, but is free to slide a limited distance parallel with the shaft axis. Member 16 is fastened by bolts 20 to flanged member 21. The latter has a cylindrical sleeve portion 22 which slides freely on collar 23, an integral part of shaft 13, and on the outside of the sleeve portion 24 of plate member 15. As thus assembled there exists between plate member 15 and annular member 16 at their peripheries an annular groove in which fit friction blocks 25. These constitute portions of two band members, each of which comprises friction blocks 25, strap 26 and weighting segments 27, these elements being fastened together by rivets 28. In order to secure flexibility of band the friction element, which has considerable radial thickness at points where it frictions against the driven members, is thinned at intervals as shown, these thinner parts being used also for riveting. The weighting segments are riveted in their middle portions to the strap, the point of riveting on the strap being half way between the rivets of the friction element. The construction gives flexibility and moreover permits the removal and replacement of the friction material without disturbing the weighting segments, since the rivets by which the former is held can be reached at the gaps between the weighting segments. Each of straps 26 engage at one of their ends with one of radial arms 29, the strap ends being slotted as at 30 to accommodate the arms and having bent portions 31 to give a satisfactory surface of contact. With this construction the bands can be driven by the arms when the latter are revolving in the direction of the arrow while at the same time they are free to adjust themselves radially. Arms 29 are integral with cylindrical member 32 which is bolted at 33 to the flywheel and to flange 34 of engine shaft 12 so that shaft, flywheel, cylindrical member and radial arms act as a unit. Weighting segments 27 carry projecting from their inside faces, overhanging lugs 35 provided with surfaces 36 and 37 adapted to engage the outer edge of cylindrical member 32. Springs 38 attached to pins 39 in the end weighting segments 27 of each band tend to draw the ends of the band together and to compress it into smaller diameter, the limit of such movement being reached when surfaces 36 of the weighting segments rest on the outside face of cylindrical member 32. When the engine is rotating at high speed the contrifugal force of the bands causes them to expand against this spring tension, the limit of such movement being reached when surfaces 37 of the weighting member rest against the inside face of cylindrical member 32.

Compression spring 40 acting between plate member 15 and flanged member 21 tends to cause the latter to move to the right and squeeze the friction surfaces of the bands. Lever 41 actuated by the clutch pedal of the automobile, acting through pressure ring 42, throw off member 43, sleeve 44 and thrust ball bearing 45, presses against flange member 21. Since the rearward travel of lever 41 is limited by fixed stop 48 the movement of flanged member 21 to the right under the action of spring 40 is also limited, and by actuation of the clutch pedal, lever 41 will move to the left pushing flanged member 21 in the same direction, thus compressing spring 40 and loosening the contact between face 17 of annular member 16 and the corresponding face of the friction blocks.

Sleeve 44 is slidably supported on tube 46 but held against rotation by spline 47, the tube being rigidly attached to the clutch housing. Pressure plate 42 is slidably supported on sleeve 44 but held against rotation by spline 49. Throw off member 43 is provided with projections 50, which cooperate with similar projections 51 on pressure ring 42 and sleeve 44. In Fig. 3 the flats of these projections are opposite. By rotating member 43 about the shaft axis by means of the arm provided at one side, this member can be brought into the relation shown in Fig. 3a, where the projections of one part fall between those of the other, thus allowing sleeve 44 under the action of spring 40 to contract the space between thrust bearing 45 and pressure plate 42, the rearward position of the latter being fixed by lever 41.

Weighting members 27 are made with their centers of gravity slightly off the center line so that when they expand against the inside surface of member 32 they will tend to tilt slightly so as to relieve any pressure they might otherwise have against plate 15. This condition is shown in Fig. 4. Here annular member 16 has been moved to the left far enough to be free of the friction band and the latter by the tilting action has relieved itself from contact with plate 15.

The action of the clutch is as follows. With the engine at rest or idling slowly and the foot removed from the clutch pedal, the parts of the clutch will be as shown in Fig. 1 except that the bands will be contracted by springs 38 so that surfaces 36 of the weighting members rest on the outside face of cylindrical member 32. In this position the friction bands will not touch the surface of annular member 16 and any light side contact they may have with plate member 15 may be neglected. Under such conditions no power will be transmitted to the transmission shaft. If now the engine is speeded up, a point will be reached where the centrifugal force in the bands overcomes the spring forces, and the bands will expand until they contact with the surface of member 16 wedging themselves between this and plate member 15. Torque will then be transmitted to the transmission shaft which will increase as the speed increases. With increased speed a point will be reached where the wedging action will be sufficient to force member 16 to the left against the force of spring 40 until surfaces 37 of the weighting segments rest against the inside face of cylindrical member 32. The clutch will then be transmitting its maximum torque, which is determined by the strength of spring 40. Further increases of speed will have no effect on the torque transmission since the friction bands are already expanded to their maximum. If now the clutch pedal is depressed, lever 41 will move to the left, spring 40 will be further compressed and member 16 will be moved to the left, freeing the contact with the friction bands. The clutch may therefore be thrown out of engagement by the operator at any engine speed.

Under certain circumstances it is desirable to have the clutch in engagement with the engine at rest or idling slowly. This may be accomplished by moving through a suitable control button, available to the operator, the arm of throw off mechanism 43 to move it from the position shown in Fig. 3 to that of Fig. 3a. In the latter condition spring 40 is free to move member 16 further to the right than is otherwise possible, so that this member will engage the friction bands even when they are in their most contracted position. The clutch then acts like an ordinary clutch which is in engagement whenever the clutch pedal is released, and can be disengaged under all conditions by depressing the clutch pedal a sufficient amount.

While it is fully understood that centrifugal clutches are old for use on automobiles, having the feature of disengaging the engine from the transmission at low engine speeds, the present invention differs materially from others in operating characteristics. Whereas in the usual clutch of this type the torque transmitted at any given engine speed and spring tension depends directly on the coefficient of friction of the frictioning surfaces and thus varies through wide limits as this quantity varies due to moisture, dirt, glaze and other factors, in the present invention the principles employed render the transmitted torque practically independent of all ordinary changes in the coefficient of friction. In Patent #1,856,135 granted to Henry W. Nieman it is shown that a friction band tractively connected to a driving member and frictioning against the inside surface of a drum will, if the product of the angle of wrap and the minimum coefficient of friction is sufficiently large, transmit a torque practically independent of the actual value of the coefficient of friction. Further it is a well known mechanical expedient, in rope drives and various friction transmissions, for example, to increase the effective coefficient of friction by grooving the surfaces of contact. If the angle between plate member 15 and friction surface 17 is 45°, the effective coefficient will theoretically be increased over that for a cylindrical surface in the ratio of more than two to one. Therefore with this arrangement a shorter angle of wrap may be employed and still make the product of the effective coefficient of friction and the angle of wrap large. In the present case the angle of wrap for each of the bands is somewhat less than 180° permitting the use of two bands in the same circle, and obtaining a balanced condition.

The term effective coefficient of friction as here used denotes the tangential force due to friction developed in a unit length of band divided by the radial force causing such friction. The angle of wrap is the angle subtended by a band measured at the center of rotation in a plane at right angles to the axis of rotation. A tractive connection is one in which the leading end of the band is connected to the driving arm.

The importance of constancy of operating characteristics is apparent. By suitably proportioning the weighing segments and the strength of springs 38 and 40, the designer can be sure of securing a definite torque at any given engine speed, and the user will be freed from the necessity of making subsequent adjustments. Moreover the tractive connection of the friction bands promotes smoothness of operation and eliminates chattering and seizing at the friction surfaces.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

Having thus described our invention what we claim as new and desire to secure by Letters Patent is:

1. In a clutch to transmit rotary motion, a driving member, a driven member, an expansible friction element tractively connected to one of said members, the other of said members having a first internal bearing surface inclined to the plane of rotation of said members and a second bearing surface inclined to said first bearing surface, and means to cause an axial movement of one of said bearing surfaces in relation to the other of said bearing surfaces.

2. In a clutch to transmit rotary motion, a driving member, a driven member, one of said members having a first internal bearing surface inclined to the plane of rotation of said members and a second bearing surface inclined to said first bearing surface, an expansible friction element tractively connected to said driving member, and means independent of said surfaces to limit the extent of radial expansion of said friction element.

3. In a clutch to transmit rotary motion, a driving member, a driven member, an expansible friction element tractively connected to one of said members, the other of said members comprising an element having a first internal bearing surface inclined to the plane of rotation of said members and a second element having a bearing surface inclined to said first bearing surface, means urging one of said elements toward the other of said elements tending to cause one of said bearing surfaces to move toward the other of said bearing surfaces, and externally controllable means to move said elements relatively in the opposite direction.

4. In a clutch to transmit rotary motion, a driving member, a driven member, an expansible friction element tractively connected to one of said members, the other of said members comprising an element having a first internal bearing surface inclined to the plane of rotation of said members and a second element having a bearing surface inclined to said first bearing surface, means urging one of said elements toward the other of said elements tending to cause one of said bearing surfaces to move toward the other of said bearing surfaces, means to set a limit to the extent of such movement and means to vary the limit set by the aforesaid means.

5. In a clutch to transmit rotary motion, a driving member, a driven member, one of said members having a first internal bearing surface inclined to the plane of rotation of said members and a second bearing surface inclined to said first bearing surface, a plurality of flexible friction elements tractively connected to the other of said members and adapted to wrappingly engage said bearing surfaces, sufficient mass being disposed along the flexible friction elements to cause the same to expand against said bearing surfaces by centrifugal action, spring means attached to and tending to contract said friction elements, and stop means to set a limit to such expansion and contraction.

6. In a clutch to transmit rotary motion, a driving member, a driven member comprising a plate element having a bearing surface in a plane perpendicular to the axis of such rotation, an annular element having a conical bearing surface concentric with said axis, spring means tending to force said elements towards each other, externally controllable means to overcome said spring means and force said bearing surfaces apart, a friction member tractively connected to said driving member and adapted to engage said bearing surfaces, spring means tending to cause the radial contraction of said friction member, weight means disposed along said friction member to cause said member to expand radially, under the action of centrifugal force, and stop means to set a limit to such contraction and expansion.

7. In a clutch to transmit rotary motion, a driving member, a driven member comprising a plate element having a bearing surface in a plane perpendicular to the axis of such rotation, an annular element having a conical bearing surface concentric with said axis, spring means tending to force said bearing surfaces towards each other, externally controllable means to overcome said spring means and force said bearing surfaces apart, a friction member tractively connected to said driving member and adapted to engage said bearing surfaces, spring means tending to cause the radial contraction of said friction member, weight means disposed along said friction member to cause said member to expand radially under the action of centrifugal force, stop means to set a limit to such contraction and expansion, and means to pull said friction member out of contact with said plate element when said friction member has reached the limit of radial expansion.

8. In a band system for a centrifugal clutch, a plurality of friction members forming an annulus, each comprising a friction element having a friction face lying in a plane and a friction face forming the surface of a cone, a flexible strap element, and weighting elements disposed along the length of each of said members, and spring means exerting tension between an end portion of each of said members and an end portion of an adjacent member.

HENRY W. NIEMAN.
GARRETT B. LINDERMAN, Jr.